United States Patent [19]
Ashton

[11] 3,780,810
[45] Dec. 25, 1973

[54] HORSESHOES

[75] Inventor: John Congreve Ashton, Sheffield, England

[73] Assignee: Benjamin Baker (Lye) Limited, Stourbridge, Worcestershire, England

[22] Filed: Aug. 2, 1972

[21] Appl. No.: 277,417

[30] Foreign Application Priority Data
Aug. 9, 1971    Great Britain .................... 37313/71

[52] U.S. Cl. .............................. 168/4, 59/36, 148/3
[51] Int. Cl. ............................................... A01l 1/00
[58] Field of Search ........................ 168/4, 2; 59/36, 59/60, 61; 148/3, 12.1

[56] References Cited
UNITED STATES PATENTS
| | | | |
|---|---|---|---|
| 250,865 | 12/1881 | Wittenstrom | 59/61 UX |
| 1,984,458 | 12/1934 | Burgess | 148/3 |
| 2,339,842 | 1/1944 | Digby | 148/3 X |

*Primary Examiner*—Hugh R. Chamblee
*Attorney*—John C. Vassil

[57] ABSTRACT

Horseshoe and method of manufacture which comprises casting of metal, preferably carbon steel and annealing. A horseshoe made by such method is capable of having any one or combination of features which are expensive, difficult or impossible to produce utilising conventional horseshoe manufacturing techniques.

14 Claims, 13 Drawing Figures

PATENTED DEC 25 1973 3,780,810

HORSESHOES

The invention relates to horseshoes.

According to one aspect of the invention there is provided a method of manufacturing a horseshoe which comprises casting it of a metal and subsequently annealing.

Such metal may be carbon steel and the casting may comprise shell moulding. The annealing may be at a temperature of the order of 960°C, for at least two hours followed by cooling in the furnace.

According to a further aspect of the invention there is provided a metal horseshoe which has been cast and annealed.

Preferably the metal comprises a carbon steel having the following specification in parts by weight:

| Carbon | 0.08 to 0.17 | Nickel | 0.15 maximum |
|---|---|---|---|
| Silicon | 0.35 | Chromium | 0.15 maximum |
| Manganese | 0.80 | Molybdenum | 0.10 maximum |
| Sulphur | 0.04 maximum | Copper | 0.10 maximum |
| Phosphorus | 0.04 maximum | Tin | 0.01 maximum |

The horseshoe may include any one or combination of the following features:

1. A full width of material in the toe with the shoe tapering in the heels.
2. A heel formed round through 90° with or without a toe piece.
3. A ground engaging surface formed with serrations to reduce skidding in use.
4. Clips cast in the shoe.
5. A seating or champher of the inner edge of the hoof engaging surface.
6. A three quarter fullering without any deformation.
7. A heel which is cut away at the inside or bevelled.
8. A ground engaging surface of which the inner edge is champhered in concave form.

It has been found that utilising a carbon steel as hereinbefore disclosed and using a shell moulding technique a horseshoe can be manufactured having a fine grain size after annealing to provide sufficient tensile strength and which is sufficiently ductile for normal use. By fine grain size is meant having a fully recrystallised equi-axed grain structure without any grain growth having taken place in annealing.

By utilising casting for manufacture an extremely good finish can be obtained with a combination of features which cannot be economically provided in a horseshoe manufactured by conventional techniques.

The foregoing and further features of the invention may be more readily understood from the following description of some preferred embodiments thereof, by way of example, with reference to the accompanying drawings, in which.

Before considering the drawings in detail the method of making all the various horseshoes will be considered. All the shoes are manufactured utilising carbon steel having a composition as follows in parts by weight:

| Carbon | 0.08 to 0.17 | Nickel | 0.15 maximum |
|---|---|---|---|
| Silicon | 0.35 | Chromium | 0.15 maximum |
| Manganese | 0.80 | Molybdenum | 0.10 maximum |
| Sulphur | 0.04 maximum | Copper | 0.10 maximum |
| Phosphorus | 0.04 maximum | Tin | 0.01 maximum |

The shoes are all cast utilising the shell moulding technique followed by annealing at a temperature of 960°C and holding or "soaking" at this temperature for two hours, followed by cooling in the furnace.

Figure 1:
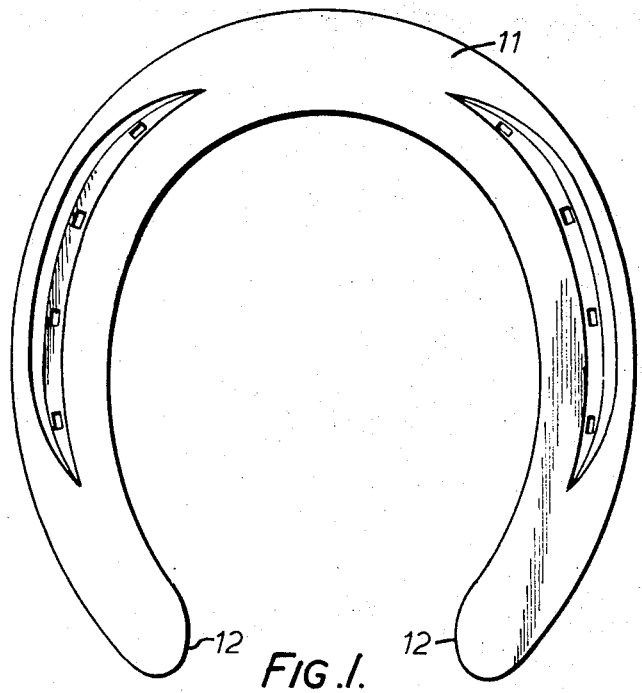
FIG. 1 is a plan view of the ground engaging surface of a horseshoe which has full width at the toe and is tapered at the heels.

Referring now firstly to FIG. 1 of the drawings there is shown a horseshoe which has a full width of material at the toe 11 and in which the heels 12 are tapered.

Figure 2:
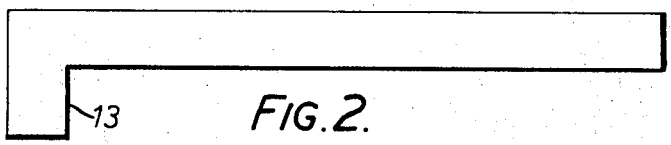
FIG. 2 is a side elevational view of a horseshoe formed with a heel normal to the main body of the shoe.

FIG. 2 shows a horseshoe formed, in the casting, with a heel 13 which is normal to the remainder of the body of the shoe.

Figure 3:
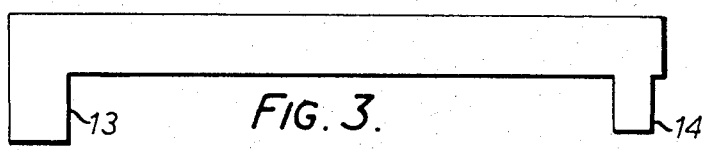
FIG. 3 is a side elevational view of a horseshoe formed with a heel and a toe both normal to the main body of the shoe.

FIG. 3 is a similar shoe to that illustrated in FIG. 2 with the addition of a toe portion 14 which is normal to the remainder of the body of the shoe.

Figure 4:
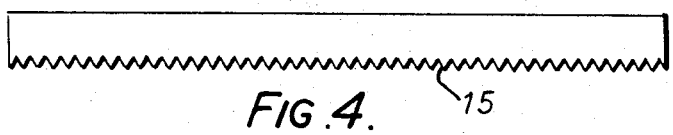
FIG. 4 is a side elevational view of a horseshoe with a serrated ground engaging surface.

FIG. 4 shows a horseshoe with a ground engaging surface 15 which is serrated so as to prevent or reduce skidding, in use.

Figure 5:
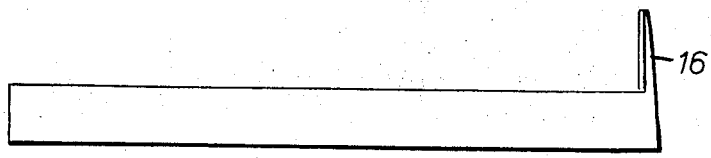
FIG. 5 is a side elevational view of a horseshoe formed with a clip at the toe of the shoe.
Figure 6:
FIG. 6 is a front elevational view of the horseshoe of FIG. 5.

FIGS. 5 and 6 show a horseshoe which is formed, in the casting, with a clip 16 at the toe of the shoe.

Figure 7:
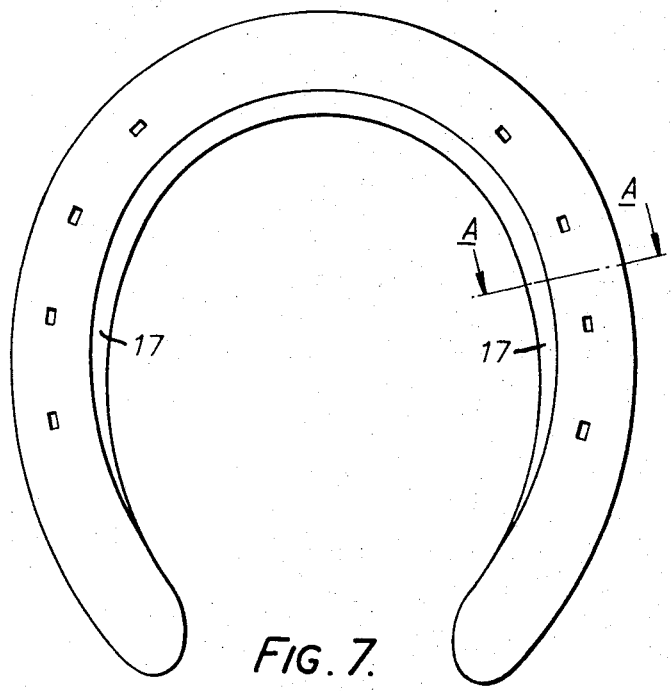
FIG. 7 is a plan view of the foot engaging surface of a horseshoe formed with a seating or champher on its inner edge.
Figure 8:
FIG. 8 is a sectional view along line AA of FIG. 7.

FIGS. 7 and 8 show a horseshoe formed with a seating or champher 17 formed at the inner edge of the foot engaging surface of the shoe.

Figure 9:
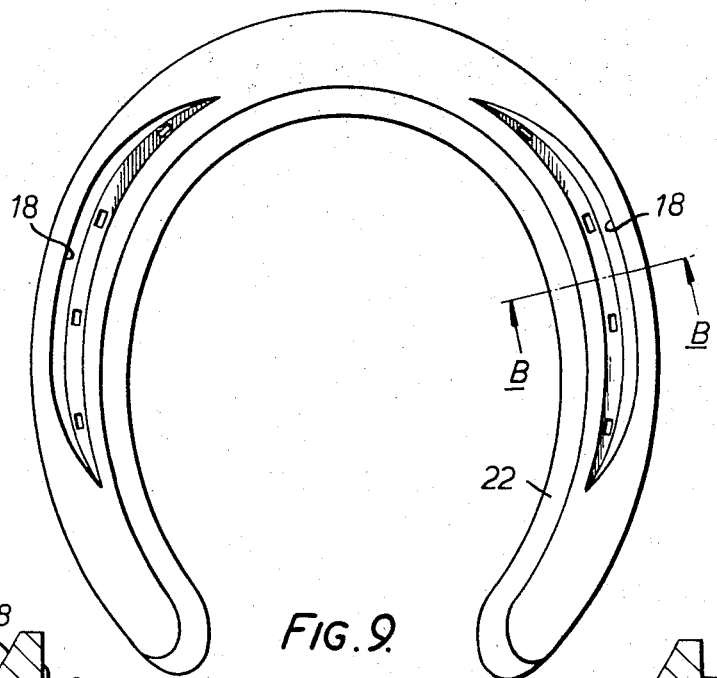
FIG. 9 is a plan view of the ground engaging surface of a horseshoe formed with a three quarter fullering and a concave champher on its inner edge.
Figure 10:
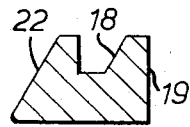
FIG. 10 is a sectional view along the line BB of FIG. 9.
Figure 11:
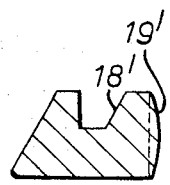
FIG. 11 is a sectional view similar to FIG. 9 of a prior art horseshoe.

FIGS. 9 and 10 show a horseshoe formed with a three quarter fullering 18 during the casting. It should be noted that the outer edge 19 of the shoe adjacent fullering 18 is not deformed. In contrast FIG. 11 illustrates a sectional view similar to FIG. 10 of a prior art horseshoe in which the fullering 18' has been produced by punching. It will be seen in this shoe the outer edge 19' has been deformed by the punching operation. In FIGS. 9 and 10 the inner edge of the ground engaging surface is champhered at 22 to provide a self-cleaning shoe.

Figure 13:
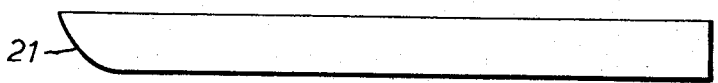
FIG. 13 is a side elevational view of a horseshoe with bevelled heel.
Figure 12:
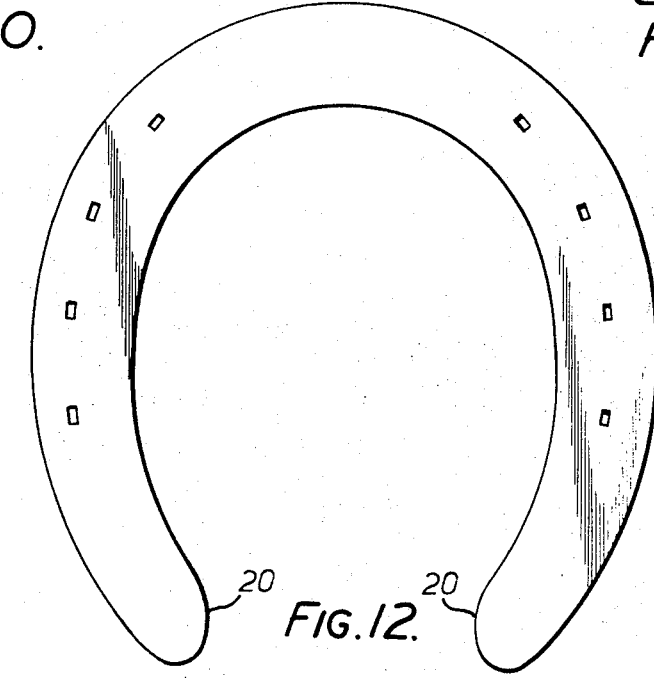
FIG. 12 is a plan view of a horseshoe with the inside of the heels cut away.

FIG. 12 shows a horseshoe in which the heels 20 are cut away and FIG. 13 shows a horseshoe in which the heel is bevelled at 21.

The features illustrated singly in the drawings may be combined in some cases where appropriate. All the features illustrated are desirable for different uses and all are expensive, difficult or impossible to produce utilising conventional horseshoe manufacturing techniques.

What is claimed is:

1. A method of manufacturing a horseshoe which comprises casting the horseshoe of a carbon steel metal wherein the carbon steel comprises:

| Carbon | 0.08 to 0.17 | Nickel | 0.15 maximum |
|---|---|---|---|
| Silicon | 0.35 | Chromium | 0.15 maximum |
| Manganese | 0.80 | Molybdenum | 0.10 maximum |
| Sulphur | 0.04 | Copper | 0.10 maximum |
| Phosphorus | 0.04 | Tin | 0.01 maximum | in parts by weight and, subsequently annealing the casting.

2. A method as claimed in claim 1 wherein the annealing is at a temperature of the order of 960°C for at least two hours followed by cooling in a furnace.

3. A method as claimed in claim 1 wherein the casting comprises shell moulding.

4. A metal horseshoe which has been cast and annealed wherein the metal comprises carbon steel having the following constituents:

| Carbon | 0.08 to 0.17 | Nickel | 0.15 maximum |
|---|---|---|---|
| Silicon | 0.35 | Chromium | 0.15 maximum |
| Manganese | 0.80 | Molybdenum | 0.10 maximum |
| Sulphur | 0.04 maximum | Copper | 0.10 maximum |
| Phosphorus | 0.04 maximum | Tin | 0.01 maximum | in parts by weight.

5. A horseshoe as claimed in claim 4 having a full width of material in the toe and tapering in the heels.

6. A horseshoe as claimed in claim 4 having a heel formed round through 90°.

7. A horseshoe as claimed in claim 6 formed with a toe piece.

8. A horseshoe as claimed in claim 4 having a ground engaging surface formed with serrations.

9. A horseshoe as claimed in claim 4 having clips cast therein.

10. A horseshoe as claimed in claim 4 having the inner edge of the hoof engaging surface champhered.

11. A horseshoe as claimed in claim 4 having a three quarter fullering without deformation.

12. A horseshoe as claimed in claim 4 having a heel which is cut away at the inside.

13. A horseshoe as claimed in claim 4 having a heel which is bevelled.

14. A horseshoe as claimed in claim 4 having a ground engaging surface of which the inner edge is champhered in concave form.

* * * * *